Patented May 26, 1953

2,640,083

UNITED STATES PATENT OFFICE 2,640,083

MANUFACTURE OF VANILLIN AND ITS HOMOLOGUES

Jonas Kamlet, Easton, Conn., assignor to Mathieson Chemical Corporation, a corporation of Virginia No Drawing. Application November 9, 1949, Serial No. 126,439

5 Claims. (Cl. 260—600)

My invention relates to an improved process for preparing vanillin and its homologues. More particularly, it relates to improvements in a process whereby vanillin and its homologues are manufactured from cheaper and more readily available raw materials and with improved yields compared to present commercial practice, and my invention especially resides in an improved cyclic procedure wherein the expensive reagents employed are readily recovered in usable form and return to the process.

A number of processes have been proposed for the manufacture of vanillin and its homologues, but these methods are generally characterized by their use of costly reagents, tedious and difficult operational techniques, and/or notably poor yields of the desired end product.

One of the more attractive proposals for improving commercial production of vanillin has been disclosed by Boedecker and Volk in U. S. Patent No. 2,062,205. The patent describes a method for preparing vanillin by condensing guaiacol with glyoxylic acid in alkaline solution to form m-methoxy-p-hydroxyphenylglycollic acid, then oxidizing it to the corresponding glyoxylic acid with a mild oxidizing agent such as cupric oxide, lead dioxide, manganese dioxide, and the like and then decarboxylating this glyoxylic acid to vanillin. The process is represented graphically as follows:

(1)
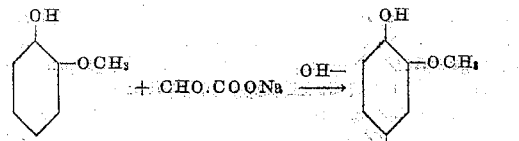

(2)
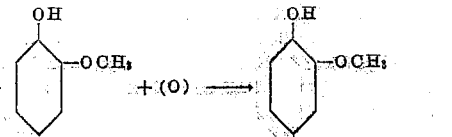

(3)
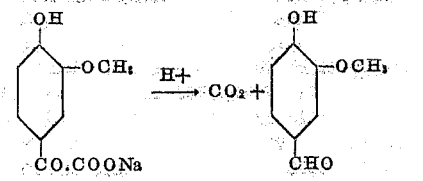

While this process looked promising in its simplicity and is operable on a small scale, separation of the end products is extremely difficult. For the presence of the by-products of the heavy metal oxide oxidizing agent in the reaction mass provokes a difficult separation problem and under production conditions represents a serious disadvantage of this process. Thus when cupric oxide is employed as the oxidizing agent, a reaction mass comprising a heavy slurry of finely divided cuprous oxide results. On a production scale, filtration of this mass requires three to four days and must be followed by numerous washings of the filter cake to remove adhering vanillin-containing solution. This is not only an expensive and tedious operation, but it results in an undesirable dilution of the vanillin solution, requiring the handling of large volumes of reagents and it ties up production equipment.

I have now discovered that if an acid, such as hydrochloric acid or hydrobromic acid, is added to the alkaline reaction slurry in an amount sufficient to liberate the free m-alkyloxy-p-hydroxybenzaldehyde, the troublesome cuprous oxide is taken into solution as an aqueous solution of a hydrocuprous halide. I have found that the free m-alkyloxy-p-hydroxybenzaldehyde may then be readily extracted from the reaction mixture with an organic solvent and that the hydrocuprous halide in the aqueous residue of the extraction may be oxidized to regenerate the corrsponding cupric halide, which is then recycled. The regenerated cupric halide before recycling may be reacted with an alkali metal hydroxide to form the cupric hydroxide utilized in the oxidation step, or the cupric hydroxide may be formed in situ by recycling the cupric halide to the glycollic acid salt to which has been added excess alkali metal hydroxide.

The improved process according to my invention may be illustrated graphically as follows:

(1)
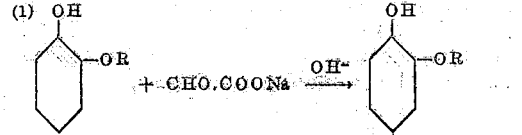

(2)
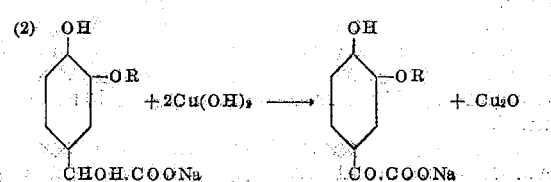

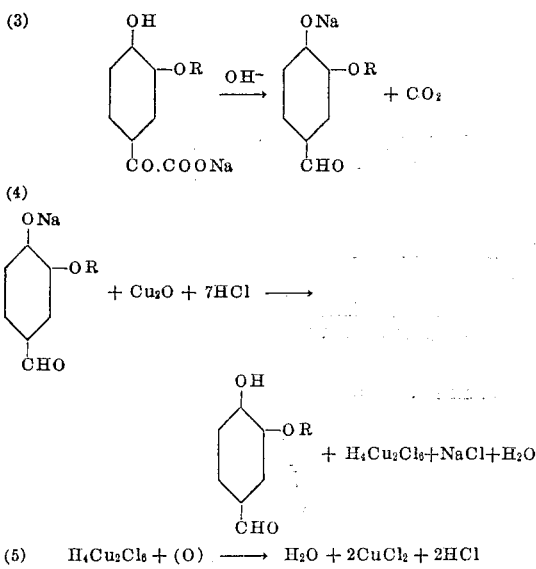

(5) $H_4Cu_2Cl_6 + (O) \longrightarrow H_2O + 2CuCl_2 + 2HCl$

Thus my invention eliminates the necessity of filtering a heavy slurry of cuprous oxide from the reaction mass containing vanillin. It avoids dilution of the end product solution by washings from the filter cake. It provides a simple and inexpensive method for regenerating the oxidizing agent for use in the succeeding batch while simultaneously recovering the vanillin formed from the reaction mixture.

A higher homologue of guaiacol may be substituted for guaiacol which results in the formation of comparable yields of the corresponding higher homologues of vanillin. For example, guaiethol (o-ethoxyphenol) will yield ethyl vanillin (m-ethoxy-p-hydroxybenzaldehyde), o-sec-butoxyphenol will yield m-sec-butoxy-p-hydroxybenzaldehyde (melting point 45° C.), and so forth. Ethyl vanillin, in particular, is very useful as a flavoring agent since its vanilla flavor is about 3 to 4½ times as concentrated as a corresponding quantity by weight of vanillin and its flavor is more nearly like that of the vanilla bean.

The alkali metal glyoxylate used in my improved process may be prepared by a variety of methods. It may be prepared by chlorinating an aqueous solution of glyoxal at a temperature kept below about 10° C., by adequate cooling, in the presence of a carbonate of an alkali metal or of an alkaline-earth metal or a bicarbonate of an alkali metal, for example, as follows:

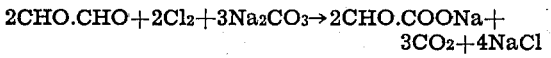

It may be prepared by electrolytic reduction of oxalic acid. It may be prepared by reduction of oxalic acid with sodium amalgam.

The glyoxylic acid concentration of the alkali metal glyoxylate solution may be determined in several different ways, for example, by precipitation as the aminoguanidine Schiff base,

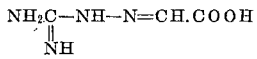

which is filtered off, dried and weighed. Alternatively, it may be determined as glyoxylic acid dixanthyl-hydrazine by use of xanthydrol and hydrazine, or gravimetrically by precipitation with dimethyldihydroresorcinol as glyoxylic acid-dimedone.

In reacting the guaiacol or higher homologue with the alkali metal salt of glyoxylic acid, I have found it advantageous to employ an excess over the stoichiometrical amount of guaiacol or guaiacol homologue to avoid substitution of two CHOH.COONa groups on the guaiacol ring. Accordingly, I use from about 1.10 to 1.50 moles of guaiacol per mole of the alkali metal salt of glyoxylic acid. The condensation is complete after 24 to 48 hours of standing at room temperature, 15° to 25° C., after which excess guaiacol or guaiacol homologue is recovered from the reaction mixture by acidification and solvent extraction or steam distillation.

Although only two moles of cupric hydroxide per mole of m-alkyloxy-p-hydroxyphenylglycollate are theoretically required, I have found it desirable to employ a considerable excess, that is, about 6 moles of $Cu(OH)_2$. This excess of $Cu(OH)_2$ is required because of the presence of other reducing agents in the sodium glyoxylate solution, such as salts of glycollic acid, oxalic acid, glyoxal, etc. Any unreduced $Cu(OH)_2$ is, of course, converted to $CuCl_2$ upon the addition of the hydrochloric acid and is recycled in the process. Cupric hydroxide may be precipitated in situ by reaction of cupric halide with caustic alkali, or the cupric halide may be converted to cupric hydroxide by reaction with an alkali metal hydroxide. The reaction mixture is then heated for a short period of time so that the cupric hydroxide oxidizes the salt of m-alkyloxy-p-hydroxyphenyl-glycollic acid to the corresponding salt, the glycollic acid decarboxylating spontaneously to yield the alkali metal salt of vanillin. The cupric hydroxide simultaneously is reduced to a copious slurry of finely divided cuprous oxide.

The reaction mass comprising a solution of the alkali metal salt of vanillin and a copious slurry of cuprous oxide is reacted with aqueous hydrochloric acid, the acid liberating free vanillin from the alkali metal salt of vanillin and the hydrochloric acid reacting with the cuprous oxide to form an aqueous solution of a hydrocuprous halide. An essential feature of the process according to my invention is the susceptibility of cuprous oxide to solution in excess hydrochloric or hydrobromic acid so as to form an aqueous solution of the hydrocuprous halogen acid which probably has the formula $H_4Cu_2X_6$ where X is chlorine or bromine. By thus solubilizing the heavy slurry of cuprous oxide and simultaneously liberating, or "springing," the vanillin in a form in which it can be readily extracted by an organic solvent such as benzene, toluene, xylene, etc., the major obstacle to commercial use of the proposed Boedecker-Volk type process is obviated.

Although either hydrobromic acid or hydrochloric acid may be used in my process, I consider that hydrochloric acid is superior in the practical sense in commercial operation.

The hydrocuprous chloride solution, which is colorless when freshly prepared and free of cupric salts, is readily oxidized to the cupric state. This oxidation can be effected with air, an oxygen-containing gas, an alkali metal chlorate, chlorine, bromine, etc. The simplest method involves passing air through the solution until titration indicates complete conversion to the cupric state. The excess acid is then neutralized with an alkali metal hydroxide, carbonate or bicarbonate and the resultant solution of cupric chloride is concentrated to the density required and recycled. Since the process according to my invention is advantageously a cyclic one, alkali metal chloride will accumulate in the solution and tend to precipitate during concentration. It is necessary to filter it off from time to time, and thus periodically remove it from the cupric chloride recycle solution.

The following example will serve to better illustrate my invention although it is not intended to set out procedural or other limitations, except insofar as I have already indicated.

Example I

To 800 cc. of a 9.6% sodium glyoxylate solution (0.8 mole) was added a freshly prepared solution of 40 grams (1.0 mole) of guaiacol in 800 cc. of cold water. The mixed solution was allowed to stand at a temperature of 15° to 20° C. for 48 hours. At the conclusion of this period, the reaction mixture was made slightly acid to Congo red paper by adding 22° Bé. hydrochloric acid and then extracted with three 300 cc. portions of benzene. The combined benzene extracts were evaporated, whereupon 38.8 grams of guaiacol were recovered (31% of theoretical), which may be returned to the process and used in the next batch. This represents the stoichiometrical excess of guaiacol used and that portion of the starting material which remained unreacted.

To the solution of 3-methoxy-4-hydroxyphenylglycollic acid obtained after extraction of the unreacted guaiacol, a slurry of 1035 grams (6.0 moles) of $CuCl_2.2H_2O$ in a liter of water was added, followed immediately with stirring, by the addition of 1200 cc. of 50% NaOH solution (15.0 moles). The reaction mixture was then transferred to an autoclave and heated to 120° to 125° C. for 3 hours with shaking or stirring. The maximum pressure encountered was about 20 pounds per square inch.

At the conclusion of the reaction, the reaction mixture was cooled to 80° C. and acidified carefully with 2000 cc. of 22° Bé. hydrochloric acid. The reaction mixture was cooled to 50° to 60° C. and extracted with four 500 cc. portions of benzene. The combined benzene extracts were then evaporated to recover a light brown mass of crystals of crude vanillin.

The aqueous residue of the vanillin extraction was neutralized with a 50% NaOH solution and was then concentrated and oxidized simultaneously by passing a current of hot air through the solution, preferably while heating the latter. At one or more points it may be necessary to filter off precipitated sodium chloride. Completion of the oxidation of the cuprous salt to the cupric salt can be accelerated by the addition of a few grams of sodium chlorate to the slurry. After addition of a small amount of fresh cupric chloride to compensate for mechanical losses, regeneration of the slurry of 1035 grams of $CuCl_2.2H_2O$ in a liter of water required for the oxidation of the 3-methoxy-4-hydroxyphenylglycollic acid is accomplished as already described.

This procedure yields a crude vanillin substantially free of isomeric ortho- and isovanillin, which may be further purified.

The filter cake of crude vanillin was dissolved in 525 cc. of 25% sodium bisulfite solution at 50° C. and sufficient warm water at 50° C. to dissolve the crystalline adduct completely. This warm solution was rapidly filtered from a small amount of insolubles and the filtrate treated with a solution of 75 grams of potassium chloride in 225 cc. of water heated to 50° C. The reaction mixture was then allowed to stand overnight, and the copious precipitate of vanillin potassium bisulfite adduct then filtered off and washed on the filter with a little KCl solution, viz., the KCl solution used to precipitate the next batch.

The filter cake of vanillin potassium bisulfite was then added, with stirring, to a solution of 55 grams of soda ash in 500 cc. of warm water. The mixture was stirred until effervescence ceased, cooled to room temperature or below, and then filtered. The precipitated vanillin was washed with cold water, the wash water being returned to the process, and then dried at a temperature not exceeding 50° C.

Ninety-eight grams of pure vanillin with a melting point of 80° to 81° C. resulted which is equivalent to a yield of 64.5% of theoretical. With 31.0% of theoretical yield accounted for by the recovered guaiacol, the overall yield of vanillin thus was 95.5% of theoretical as based on the guaiacol.

Example II

In the process illustrated by Example I, substitution of 139 grams of guaiethol (o-ethoxyphenol) for the guaiacol yielded 107 grams of ethyl vanillin of a melting point of 76.5° to 77.5° C. which is equivalent to a yield of 64.4% of theoretical. With 30.0% of theoretical accounted for by recovery of 42.0 grams of guaiethol, the overall yield of ethyl vanillin is 94.4% of theory, based on the guaiethol.

Example III

In the process illustrated by Example I, the use of 167 grams of o-sec-butoxyphenol in place of guaiacol yielded 59.8% of the theoretical amount of m-sec-butoxy-p-hydroxyphenylbenzaldehyde. With 32% of theoretical accounted for by recovery of unreacted o-sec-butoxyphenol, the overall yield of the m-sec-butoxy-p-hydroxyphenylbenzaldehyde is 91.8% of theoretical, as based on the phenol.

I claim:

1. In the manufacture of an alkyloxy-hydroxybenzaldehyde by condensation of an o-alkyloxyphenol with an alkali metal glyoxylate to form the corresponding alkali metal salt of m-alkyloxy-p-hydroxyphenylglycollic acid, oxidation of this glycollate in an alkaline environment with a cupric compound utilized as cupric hydroxide to form the corresponding salt of m-alkyloxy-p-hydroxyphenylglyoxylic acid and cuprous oxide, and decarboxylation of this glyoxylate so as to form a reaction mixture containing the alkali metal salt of the corresponding m-alkyloxy-p-hydroxybenzaldehyde, the improvement which comprises adding to the reaction mixture an acid selected from the group consisting of hydrochloric acid and hydrobromic acid in an amount sufficient to liberate the m-alkyloxy-p-hydroxybenzaldehyde and to dissolve the cuprous oxide as an aqueous solution of a hydrocuprous halide, extracting the free m-alkyloxy-p-hydroxybenzaldehyde from the reaction mixture with an organic solvent, oxidizing the hydrocuprous halide in the aqueous residue of said extracted reaction mixture to regenerate the corresponding cupric halide, and then recycling same to the oxidation of the glycollate.

2. The improvement according to claim 1 wherein the o-alkyloxyphenol is guaiacol.

3. The improvement according to claim 1 wherein the cupric halide regenerated is reacted with an alkali metal hydroxide to form cupric hydroxide which is recycled to the oxidation of the glycollate.

4. The improvement according to claim 1 wherein the cupric hydroxide is formed in situ by the addition of the cupric halide to a solution of m-alkyloxy-p-hydroxyphenylglycollic acid salt containing excess alkali metal hydroxide.

5. The improvement according to claim 1 wherein the o-alkyloxyphenol is guaiethol.

JONAS KAMLET.

References Cited in the file of this patent

UNITED STATES PATENTS

| Number | Name | Date |
|---|---|---|
| 2,062,205 | Boedecker | Nov. 24, 1936 |
| 2,199,748 | Mather et al. | May 7, 1940 |
| 2,516,827 | Marshall et al. | July 25, 1950 |

OTHER REFERENCES

Elder et al., Textbook of Chemistry (Harpers, 1948), p. 579.